United States Patent
Rich et al.

(10) Patent No.: US 12,247,619 B2
(45) Date of Patent: Mar. 11, 2025

(54) SOLENOID LOW FRICTION BEARING LINER

(71) Applicant: VERSIV COMPOSITES LIMITED, Kilrush (IE)

(72) Inventors: David A. Rich, Nashua, NH (US); Nicole M. DiRando, Waltham, MA (US)

(73) Assignee: VERSIV COMPOSITES LIMITED, Kilrush (IE)

( * ) Notice: Subject to any disclaimer, the term of this patent is extended or adjusted under 35 U.S.C. 154(b) by 0 days.

(21) Appl. No.: 18/506,396

(22) Filed: Nov. 10, 2023

(65) Prior Publication Data
US 2024/0077107 A1 Mar. 7, 2024

Related U.S. Application Data

(63) Continuation of application No. 17/643,199, filed on Dec. 8, 2021, now Pat. No. 11,852,194.
(Continued)

(51) Int. Cl.
*F16C 17/02* (2006.01)
*F16C 33/20* (2006.01)
*H01F 7/16* (2006.01)

(52) U.S. Cl.
CPC ............ *F16C 33/201* (2013.01); *F16C 17/02* (2013.01); *F16C 33/206* (2013.01);
(Continued)

(58) Field of Classification Search
CPC ...... F16C 17/02; F16C 33/201; F16C 33/203; F16C 33/205; F16C 33/206; F16C 33/208;
(Continued)

(56) References Cited

U.S. PATENT DOCUMENTS

| 5,141,800 A | 8/1992 | Effenberger et al. |
| 6,376,062 B1 | 4/2002 | Adam |

(Continued)

FOREIGN PATENT DOCUMENTS

| CN | 103998237 A | * | 8/2014 | ............ B32B 15/08 |
| CN | 104159967 A | * | 11/2014 | ............ C08L 27/18 |

(Continued)

OTHER PUBLICATIONS

International Search Report and Written Opinion for PCT Application No. PCT/US2021/072793, dated Mar. 18, 2022, 10 pages.
(Continued)

*Primary Examiner* — Phillip A Johnson
(74) *Attorney, Agent, or Firm* — CANTOR COLBURN LLP

(57) ABSTRACT

The present disclosure relates to a low friction bearing liner for a solenoid may include a low friction layer. The low friction layer may include a first fluoropolymer matrix component and a first thermoplastic filler component distributed throughout the first fluoropolymer matrix component. The content of the first fluoropolymer matrix component may be at least about 1 wt. % and not greater than about 99 wt. % for a total weight of the first low friction layer. The content of the first thermoplastic filler component may be at least about 1 wt. % and not greater than about 99 wt. % for a total weight of the first low friction layer.

19 Claims, 4 Drawing Sheets

Related U.S. Application Data

(60) Provisional application No. 63/124,362, filed on Dec. 11, 2020.

(52) U.S. Cl.
CPC ........ *H01F 7/1607* (2013.01); *F16C 2202/02* (2013.01); *F16C 2202/50* (2013.01); *F16C 2208/02* (2013.01); *F16C 2208/58* (2013.01); *F16C 2240/60* (2013.01); *F16C 2380/00* (2013.01)

(58) Field of Classification Search
CPC .............. F16C 2208/02; F16C 2208/04; F16C 2208/08; F16C 2208/20; F16C 2208/30; F16C 2208/32; F16C 2208/34; F16C 2208/36; F16C 2208/40; F16C 2208/52; F16C 2208/58; F16C 2208/60; F16C 2208/62; F16C 2208/70; F16C 2240/60; H01F 7/08; H01F 7/16; H01F 7/1607; H01F 2007/163
See application file for complete search history.

(56) References Cited

U.S. PATENT DOCUMENTS

| | | | |
|---|---|---|---|
| 7,147,378 B2 | 12/2006 | Chu et al. | |
| 7,217,754 B2 | 5/2007 | Koloski et al. | |
| 8,298,969 B2 | 10/2012 | Bahukudumbi | |
| 8,646,977 B2 | 2/2014 | Adam | |
| 10,307,991 B2 | 6/2019 | Speicher et al. | |
| 10,760,027 B2 | 9/2020 | Yamasaki | |
| 2003/0022797 A1* | 1/2003 | Oohira | F16C 33/6648 508/136 |
| 2004/0109055 A1 | 6/2004 | Pan et al. | |
| 2010/0290726 A1 | 11/2010 | Schlipf et al. | |
| 2012/0138835 A1 | 6/2012 | Hunter | |
| 2012/0251020 A1* | 10/2012 | Swei | F16C 33/205 428/327 |
| 2015/0093066 A1 | 4/2015 | Speicher et al. | |
| 2016/0319867 A1 | 11/2016 | Adam et al. | |
| 2017/0082142 A1 | 3/2017 | Burgess | |
| 2020/0207125 A1 | 7/2020 | McNamara et al. | |
| 2020/0208681 A1 | 7/2020 | McNamara et al. | |
| 2020/0300298 A1 | 9/2020 | DiMartino et al. | |
| 2021/0172544 A1 | 6/2021 | Belzner | |
| 2022/0184981 A1 | 6/2022 | Rich et al. | |
| 2022/0186782 A1 | 6/2022 | Rich et al. | |

FOREIGN PATENT DOCUMENTS

| | | | | |
|---|---|---|---|---|
| DE | 102008017654 A1 | * | 10/2008 | ............. B32B 15/08 |
| DE | 102016116776 A1 | * | 3/2018 | .......... F01L 13/0036 |
| EP | 2241773 B1 | | 7/2016 | |
| JP | S6077674 A | | 5/1985 | |
| JP | 2001063862 A | | 3/2001 | |
| JP | 2003049766 A | | 2/2003 | |
| JP | 2015529566 A | | 10/2015 | |
| JP | 2020526723 A | | 8/2020 | |
| KR | 20170024201 A | | 3/2017 | |
| WO | 2016133721 A1 | | 8/2016 | |
| WO | 2022126107 A1 | | 6/2022 | |
| WO | 2022126108 A1 | | 6/2022 | |

OTHER PUBLICATIONS

International Search Report and Written Opinion for PCT Application No. PCT/US2021/072794, dated Mar. 25, 2022, 12 pages.

* cited by examiner

SOLENOID LOW FRICTION BEARING LINER

CROSS-REFERENCE TO RELATED APPLICATION(S)

This Application is a continuation of and claims priority under 35 U.S.C. § 120 to U.S. patent application Ser. No. 17/643,199, entitled "SOLENOID LOW FRICTION BEARING LINER," by David A. RICH et al., filed Dec. 8, 2021, which claims priority under 35 U.S.C. § 119(e) to U.S. Provisional Patent Application No. 63/124,362, entitled "SOLENOID LOW FRICTION BEARING LINER," by David A. RICH et al., filed Dec. 11, 2020, both of which are assigned to the current assignee hereof and are incorporated herein by reference in their entireties.

FIELD OF THE DISCLOSURE

The present disclosure relates to a low friction bearing liner and, in particular, a low friction bearing liner for a use in a solenoid. The present disclosure further relates to a solenoid that includes the low friction bearing liner.

BACKGROUND

Electromagnetic solenoids generally include a barrel and a moving armature or piston within the barrel. Since the moving armature or piston contact the inner surface of the barrel during use, friction between the two parts can cause extreme metal fatigue and wear, which can reduce life expectancy of the solenoid. Accordingly, additional components within the solenoid, i.e., liners, which can reduce friction between the moving armature or piston and the inner surface of the barrel during use are desired.

SUMMARY

According to a first aspect, a low friction bearing liner for a solenoid may include a low friction layer. The low friction layer may include a first fluoropolymer matrix component and a first thermoplastic filler component distributed throughout the first fluoropolymer matrix component. The content of the first fluoropolymer matrix component may be at least about 1 wt. % and not greater than about 99 wt. % for a total weight of the first low friction layer. The content of the first thermoplastic filler component may be at least about 1 wt. % and not greater than about 99 wt. % for a total weight of the first low friction layer.

According to another aspect, a low friction bearing liner for a solenoid may include a low friction layer. The low friction layer may include a first fluoropolymer matrix component and a first thermoplastic filler component distributed throughout the first fluoropolymer matrix component. The first low friction layer may have a content ratio TFC-1$_{WC}$/FMC-1$_{WC}$ of at least about 0.01 and not greater than about 100, where TFC-1$_{WC}$ is equal to the content of the first thermoplastic filler component in weight percent for a total weight of the first low friction layer, and FMC-1$_{WC}$ is the content of the first fluoropolymer matrix component in weight percent of a total weight of the first low friction layer.

According to yet another aspect, a solenoid may include a barrel, an armature within the barrel, and a low friction bearing liner disposed between an inner surface of the barrel and an outer surface of the armature. The low friction bearing liner for a solenoid may include a low friction layer. The low friction layer may include a first fluoropolymer matrix component and a first thermoplastic filler component distributed throughout the first fluoropolymer matrix component. The content of the first fluoropolymer matrix component may be at least about 1 wt. % and not greater than about 100 wt. % for a total weight of the first low friction layer. The content of the first thermoplastic filler component may be at least about 1 wt. % and not greater than about 100 wt. % for a total weight of the first low friction layer.

According to yet another aspect, a solenoid may include a barrel, an armature within the barrel, and a low friction bearing liner disposed between an inner surface of the barrel and an outer surface of the armature. The low friction bearing liner for a solenoid may include a low friction layer. The low friction layer may include a first fluoropolymer matrix component and a first thermoplastic filler component distributed throughout the first fluoropolymer matrix component. The first low friction layer may have a content ratio TFC-1$_{WC}$/FMC-1$_{WC}$ of at least about 0.01 and not greater than about 100, where TFC-1$_{WC}$ is equal to the content of the first thermoplastic filler component in weight percent for a total weight of the first low friction layer, and FMC-1$_{WC}$ is the content of the first fluoropolymer matrix component in weight percent of a total weight of the first low friction layer.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a low friction bearing liner for a solenoid. According to certain embodiments, the low friction bearing liner may include a first low friction layer that may include a first fluoropolymer matrix component and a first thermoplastic filler component distributed throughout the first fluoropolymer matrix component.

Figure 1:
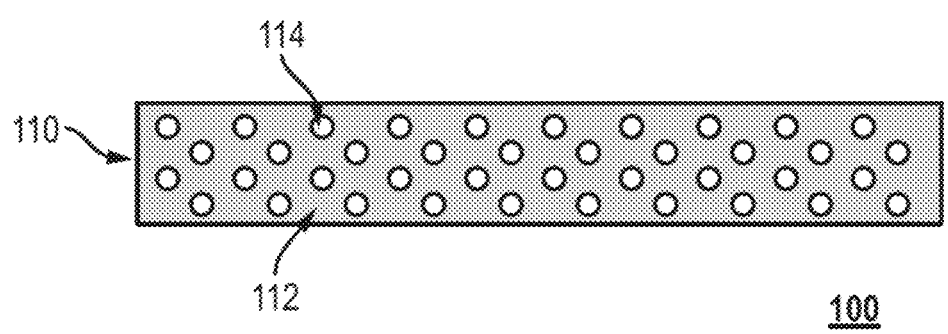
FIG. 1 includes an illustration of a low friction bearing liner configuration according to embodiments described herein, FIG. 2 includes an illustration of a low friction bearing liner configuration according to embodiments described herein, FIG. 3 includes an illustration of a low friction bearing liner configuration according to embodiments described herein, and FIG. 4 includes an illustration of a solenoid that includes a low friction bearing liner according to embodiments described herein.

For purposes of illustration, FIG. 1 includes an illustration of a low friction bearing liner 100 according to embodiments described herein. As shown in FIG. 1, a low friction bearing liner 100 may include a first low friction layer 110. As further shown in FIG. 1, the first low friction layer 110 may include a first fluoropolymer matrix component 112 and a first thermoplastic filler component 114 distributed through the first fluoropolymer matrix component 112.

According to particular embodiments, the first low friction layer 110 may have a particular content ratio TFC-1$_{WC}$/FMC-1$_{WC}$, where TFC-1$_{WC}$ is equal to the content of the first thermoplastic filler component in weight percent for a total weight of the first low friction layer, and FMC-1$_{WC}$ is the content of the first fluoropolymer matrix component in weight percent of a total weight of the first low friction layer. For example, the first low friction layer 110 may have a content ratio TFC-1$_{WC}$/FMC-1$_{WC}$ of at least about 0.01, such as, at least about 0.05 or at least about 0.1 or at least about 0.15 or at least about 0.2 or even at least about 0.25. According to still other embodiments, the first low friction layer 110 may have a content ratio TFC-1$_{WC}$/FMC-1$_{WC}$ of not greater than about 100, such as, not greater than about 90 or not greater than about 80 or not greater than about 70 or not greater than about 60 or not greater than about 50 or not greater than about 25 or not greater than about 1 or not greater than about 0.9 or not greater than about 0.8 or not greater than about 0.7 or not greater than about 0.4 or not greater than about 0.35 or even not greater than about 0.3. It will be appreciated the first low friction layer 110 may have a content ratio TFC-1$_{WC}$/FMC-1$_{WC}$ within a range between any of the minimum and maximum values noted above. It will be further appreciated that the first low friction layer 110 may have a content ratio TFC-1$_{WC}$/FMC-1$_{WC}$ of any value between any of the minimum and maximum values noted above.

According to still other embodiments, the first low friction layer 110 may have a particular content of the first fluoropolymer matrix component 112. For example, the first low friction layer 110 may have a content of the first fluoropolymer matrix component 112 of at least about 1.0 wt. % for at total weight of the first low friction layer 112, such as, at least about 5 wt. % or at least about 10 wt. % or at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or at least about 72 wt. % or at least about 74 wt. % or at least about 76 wt. % or at least about 78 wt. % or at least about 80 wt. % or at least about 82 wt. % or at least about 84 wt. % or even at least about 86 wt. %. According to still other embodiments, the first low friction layer 110 may have a content of the first fluoropolymer matrix component 112 of not greater than about 100 wt. % for a total weight of the low friction layer 112, such as, not greater than about 98 wt. % or not greater than about 96 wt. % or not greater than about 94 wt. % or not greater than about 92 wt. % or not greater than about 90 wt. % or even not greater than about 88 wt. %. It will be appreciated that the first low friction layer 110 may have a content of the first fluoropolymer matrix component 112 within a range between any of the minimum and maximum values noted above. It will be further appreciated that the first low friction layer 110 may have a content of the first fluoropolymer matrix component 112 of any value between any of the minimum and maximum values noted above.

According to still other embodiments, the first fluoropolymer matrix component 112 may include a particular material. For example, the first fluoropolymer matrix component 112 may include at least one of a fluorinated ethylene propylene material, a perfluoroalkoxy alkane material, a modified PTFE material, or a combination thereof. According to particular embodiments, the first fluoropolymer matrix component 112 may consist of a fluorinated ethylene propylene material. According to still other embodiments, the first fluoropolymer matrix component 112 may consist of a perfluoroalkoxy alkane material. According to still other embodiments, the first fluoropolymer matrix component 112 may consist of a modified PTFE material.

According to still other embodiments, the first low friction layer 110 may have a particular content of the first thermoplastic filler component 114. For example, the first low friction layer 110 may have a content of the first thermoplastic filler component 114 of at least about 1.0 wt. % for at total weight of the first low friction layer 112, such as, at least about 5 wt. % or at least about 10 wt. % or at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or at least about 72 wt. % or at least about 74 wt. % or at least about 76 wt. % or at least about 78 wt. % or at least about 80 wt. % or at least about 82 wt. % or at least about 84 wt. % or even at least about 86 wt. %. According to still other embodiments, the first low friction layer 110 may have a content of the first thermoplastic filler component 114 of not greater than about 100 wt. % for a total weight of the low friction layer 112, such as, not greater than about 98 wt. % or not greater than about 96 wt. % or not greater than about 94 wt. % or not greater than about 92 wt. % or not greater than about 90 wt. % or even not greater than about 88 wt. %. It will be appreciated that the first low friction layer 110 may have a content of the first thermoplastic filler component 114 within a range between any of the minimum and maximum values noted above. It will be further appreciated that the first low friction layer 110 may have a content of the first thermoplastic filler component 114 of any value between any of the minimum and maximum values noted above.

According to particular embodiments, the first thermoplastic filler component 114 may include a material with a particular glass transition temperature. For example, the glass transition temperature of the first thermoplastic filler component 114 may be at least about 130° C., such as, at least about 135° C. or at least about 140° C. or at least about 145° C. or at least about 150° C. or at least about 155° C. or even at least about 160° C. It will be appreciated that the glass transition temperature of the first thermoplastic filler component 114 may be within a range between any of the values noted above. It will be further appreciated that the glass transition temperature of the first thermoplastic filler component 114 may be any value between any of the values noted above.

According to particular embodiments, the first thermoplastic filler component 114 may include a material with a particular melting temperature. For example, the melting temperature of the first thermoplastic filler component 114 may be at least about 240° C., such as, at least about 245° C. or at least about 250° C. or at least about 255° C. or at least about 260° C. or at least about 265° C. or at least about 270° C. or at least about 275° C. or at least about 280° C. or at least about 285° C. or at least about 290° C. or at least about 295° C. or at least about 300° C. It will be appreciated that the melting temperature of the first thermoplastic filler component 114 may be within a range between any of the values noted above. It will be further appreciated that the melting temperature of the first thermoplastic filler component 114 may be any value between any of the values noted above.

According to still other embodiments, the first thermoplastic filler component 114 may include a particular material. For example, the first thermoplastic filler component 114 may include a polyimide (PI), a polyamide (PA), a polyamideimide (PAI), a polybenzimidazole (PBI), a polyether ether ketone (PEEK), an aromatic polyester, a polyphenylene sulfide (PPS), synthetic fibers, or any combination thereof. According to still other embodiments, the first thermoplastic filler component 114 may consist of a polyimide (PI), a polyamide (PA), a polyamideimide (PAI), a polybenzimidazole (PBI), a polyether ether ketone (PEEK), an aromatic polyester, a polyphenylene sulfide (PPS), or synthetic fibers.

According to yet other embodiments, the first low friction layer 110 may have a particular thickness. For example, the first low friction layer 110 may have a thickness of at least about 1 μm, such as, at least about 5 μm or at least about or at least about 10 μm or at least about or at least about 15 μm or at least about or at least about 20 μm or at least about or at least about 25 μm or at least about or at least about 30 μm or at least about or at least about 35 μm or at least about or at least about 40 μm or at least about or at least about 45 μm or at least about or at least about 50 μm or at least about or at least about 55 μm or at least about or at least about 60 μm or at least about 65 μm or even at least about 69 μm. According to still other embodiments, the first low friction layer 110 may have a thickness of not greater than about 125 μm, such as, not greater than about 120 μm or not greater than about 115 μm or not greater than about 110 μm or not greater than about 105 μm or not greater than about 100 μm or not greater than about 95 μm or not greater than about 90 μm or not greater than about 85 μm or not greater than about 80 μm or not greater than about 75 μm or even not greater than about 71 μm. It will be appreciated that the thickness of the first low friction layer 110 may be within a range between any of the minimum and maximum values noted above. It will be further appreciated that the first low friction layer 110 may be any value between any of the minimum and maximum values noted above.

According to yet other embodiments, the first low friction layer 110 may have a particular lubricated surface coefficient of friction. It will be appreciated that for purposes of embodiments described herein, the lubricated surface coefficient of friction of a particular layer may be measured under an 8-9 newton normal force at 100-300 mm/sec in contact with a quarter inch polyimide or steel wear sphere at a temperature of 15-140° C. and lubricated with 100-100,000 cs silicone oil. According to certain embodiments, the first low friction layer 110 may have a lubricated surface coefficient of friction of not greater than about 0.20, such as, not greater than about 0.10 or not greater than about 0.05 or not greater than about 0.02. According to still other embodiments, the first low friction layer 110 may have a lubricated surface coefficient of friction of at least about 0.005. It will be appreciated that the lubricated surface coefficient of friction of the first low friction layer 110 may be within a range between any of the minimum and maximum values noted above. It will be further appreciated that the lubricated surface coefficient of friction of the first low friction layer 110 may be any value between any of the minimum and maximum values noted above.

According to yet other embodiments, the first low friction layer 110 may have a particular non-lubricated surface coefficient of friction. It will be appreciated that for purposes of embodiments described herein, the non-lubricated surface coefficient of friction of a particular layer may be measured under an 8-9 newton normal force at 100-300 mm/sec in contact with a quarter inch polyimide or steel wear sphere at a temperature of 15-140° C. According to certain embodiments, the first low friction layer 110 may have a non-lubricated surface coefficient of friction of not greater than about 0.20, such as, not greater than about 0.10 or not greater than about 0.05 or not greater than about 0.02. According to still other embodiments, the first low friction layer 110 may have a non-lubricated surface coefficient of friction of at least about 0.005. It will be appreciated that the non-lubricated surface coefficient of friction of the first low friction layer 110 may be within a range between any of the minimum and maximum values noted above. It will be further appreciated that the non-lubricated surface coefficient of friction of the first low friction layer 110 may be any value between any of the minimum and maximum values noted above.

According to yet other embodiments, the low friction bearing liner 100 may have a particular thickness. For example, the low friction bearing liner 100 may have a thickness of at least about 1 μm, such as, at least about 5 μm or at least about or at least about 10 μm or at least about or at least about 15 μm or at least about or at least about 20 μm or at least about or at least about 25 μm or at least about or at least about 30 μm or at least about or at least about 35 μm or at least about or at least about 40 μm or at least about or at least about 45 μm or at least about or at least about 50 μm or at least about or at least about 55 μm or at least about or at least about 60 μm or at least about 65 μm or even at least about 69 μm. According to still other embodiments, the low friction bearing liner 100 may have a thickness of not greater than about 500 μm, such as, not greater than about 480 μm or not greater than about 460 μm or not greater than about 440 μm or not greater than about 420 μm or not greater than about 400 μm or not greater than about 380 μm or not greater than about 360 μm or not greater than about 340 μm or not greater than about 320 μm or not greater than about 300 μm or even not greater than about 280 μm. It will be appreciated that the thickness of the low friction bearing liner 100 may be within a range between any of the minimum and maximum values noted above. It will be further appreciated that the low friction bearing liner 100 may be any value between any of the minimum and maximum values noted above.

According to still other embodiments, the low friction bearing liner 100 may have a particular wear rating. It will be appreciated that for purposes of embodiments described herein, the wear rating may be tested using a Tribometer Test measured under a 9 newton normal force at 260 mm/sec in contact with a quarter inch polyimide wear sphere at a running temperature of 140° C. and lubricated with 6,000 cs silicone oil. The wear rating is equal to the number of rotations completed before failure in a Tribometer Test and failure is defined as a 50% increase in COF versus steady-state value during the Tribometer test. According to certain embodiments, the low friction bearing liner 100 may have a wear rating of at least about 35,000, such as, at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or even at least about 250,000. It will be appreciated that the wear rating of the low friction bearing liner 100 may be within a range between any of the minimum and maximum values noted above. It will be further appreciated that the wear rating of the low friction bearing liner 100 may be any value between any of the minimum and maximum values noted above.

Referring to additional embodiments, the low friction bearing liner may include a first low friction layer and a substrate underlying the first low friction bearing liner. According to particular embodiments, the first low friction layer may include a first fluoropolymer matrix component and a first thermoplastic filler component distributed throughout the first fluoropolymer matrix component.

Figure 2:
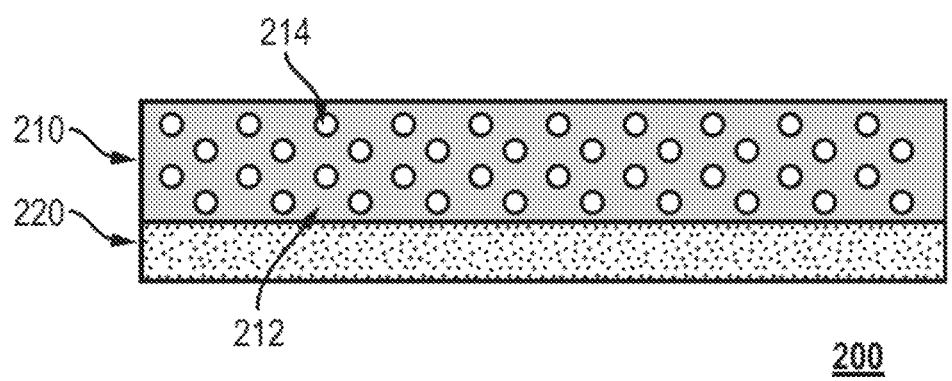

For purposes of illustration, FIG. 2 includes an illustration of a low friction bearing liner 200 according to embodiments described herein. As shown in FIG. 1, a low friction bearing liner 200 may include a first low friction layer 210, and a substrate 220 underlying the first low friction layer 210. As further shown in FIG. 2, the first low friction layer 210 may include a first fluoropolymer matrix component 212 and a first thermoplastic filler component 214 distributed through the first fluoropolymer matrix component 212.

It will be appreciated that all description provided herein in reference to the low friction bearing liner 100 and/or the first low friction layer 110 may further apply to corresponding aspects of low friction bearing liner 200.

According to still other embodiments, the substrate 220 may include a particular material. For example, the substrate 220 may include a polyimide material. According to still other embodiments, the substrate 220 may consist of a polyimide material. According to yet other embodiments, the substrate 220 may include a fabric. According to other embodiments, the substrate 220 may consist of a fabric. According to still other embodiments, the substrate 220 may include a woven fiberglass fabric. According to yet other embodiments, the substrate 220 may consist of a woven fiberglass fabric.

According to yet other embodiments, the low friction bearing liner 200 may have a particular first thickness ratio $LFL\text{-}1_T/S_T$, where $LFL\text{-}1_T$ is equal to a thickness of the first low friction layer 210 and $S_T$ is equal to the thickness of the substrate 220. For example, the low friction bearing liner 200 may have a first thickness ratio $LFL\text{-}1_T/S_T$ of at least about 0.02, such as, at least about 0.03 or at least about 0.04 or at least about 0.05 or at least about 0.06 or at least about 0.07 or at least about 0.08 or at least about 0.09. According to still other embodiments, the low friction bearing liner 200 may have a first thickness ratio $LFL\text{-}1_T/S_T$ of not greater than about 0.4, such as, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11. It will be appreciated that the first thickness ratio $LFL\text{-}1_T/S_T$ of the low friction bearing liner 200 may be within a range between any of the minimum and maximum values noted above. It will be further appreciated that the first thickness ratio $LFL\text{-}1_T/S_T$ of the low friction bearing liner 200 may be any value between any of the minimum and maximum values noted above.

According to yet other embodiments, the low friction bearing liner 200 may have a particular thickness. According to yet other embodiments, the low friction bearing liner 200 may have a particular thickness. For example, the low friction bearing liner 200 may have a thickness of at least about 1 μm, such as, at least about 5 μm or at least about or at least about 10 μm or at least about or at least about 15 μm or at least about or at least about 20 μm or at least about or at least about 25 μm or at least about or at least about 30 μm or at least about or at least about 35 μm or at least about or at least about 40 μm or at least about or at least about 45 μm or at least about or at least about 50 μm or at least about or at least about 55 μm or at least about or at least about 60 μm or at least about 65 μm or even at least about 69 μm. According to still other embodiments, the low friction bearing liner 200 may have a thickness of not greater than about 500 μm, such as, not greater than about 480 μm or not greater than about 460 μm or not greater than about 440 μm or not greater than about 420 μm or not greater than about 400 μm or not greater than about 380 μm or not greater than about 360 μm or not greater than about 340 μm or not greater than about 320 μm or not greater than about 300 μm or even not greater than about 280 μm. It will be appreciated that the thickness of the low friction bearing liner 200 may be within a range between any of the minimum and maximum values noted above. It will be further appreciated that the low friction bearing liner 200 may be any value between any of the minimum and maximum values noted above.

According to still other embodiments, the low friction bearing liner 200 may have a particular wear rating. It will be appreciated that for purposes of embodiments described herein, the wear rating may be tested using a Tribometer Test measured under a 9 newton normal force at 260 mm/sec in contact with a quarter inch polyimide wear sphere at a running temperature of 140° C. and lubricated with 6,000 cs silicone oil. The wear rating is equal to the number of rotations completed before failure in a Tribometer Test and failure is defined as a 50% increase in COF versus steady-state value during the Tribometer test. According to certain embodiments, the low friction bearing liner 200 may have a wear rating of at least about 35,000, such as, at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or even at least about 250,000. It will be appreciated that the wear rating of the low friction bearing liner 200 may be within a range between any of the minimum and maximum values noted above. It will be further appreciated that the wear rating of the low friction bearing liner 200 may be any value between any of the minimum and maximum values noted above.

Referring to yet other embodiments, the low friction bearing liner may include a first low friction layer, a substrate underlying the first low friction bearing liner, and a second low friction layer underlying the substrate. According to particular embodiments, the first low friction layer may include a first fluoropolymer matrix component and a first thermoplastic filler component distributed throughout the first fluoropolymer matrix component. According to still other embodiments, the second low friction layer may include a second fluoropolymer matrix component and a second thermoplastic filler component distributed throughout the second fluoropolymer matrix component.

Figure 3:
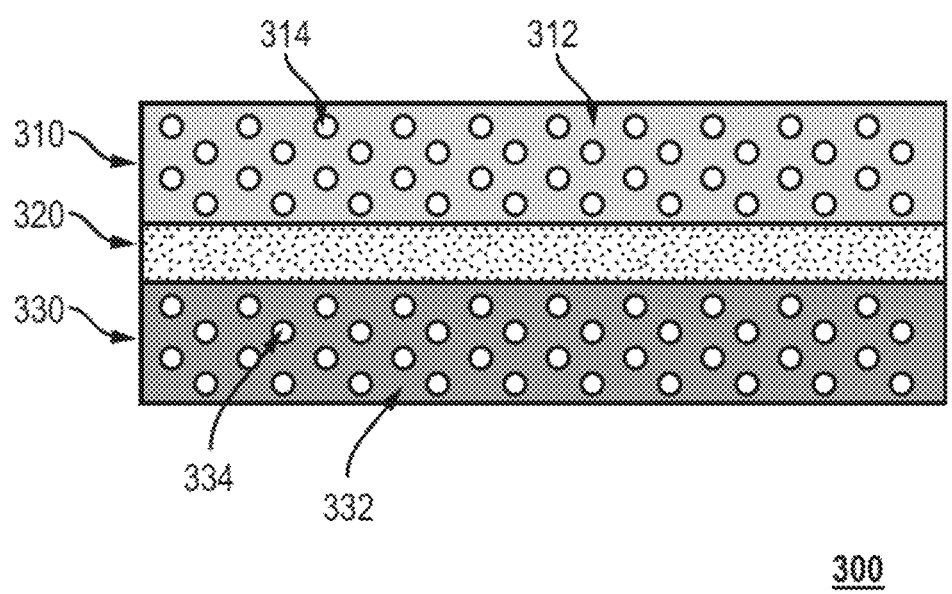

For purposes of illustration, FIG. 3 includes an illustration of a low friction bearing liner 300 according to embodiments described herein. As shown in FIG. 3, a low friction bearing liner 300 may include a first low friction layer 310, a substrate 320 underlying the first low friction layer 310, and a second low friction layer 330. As further shown in FIG. 3, the first low friction layer 310 may include a first fluoropolymer matrix component 312 and a first thermoplastic filler component 314 distributed through the first fluoropolymer matrix component 312. As also shown in FIG. 3, the second low friction layer 330 may include a first fluoropolymer matrix component 332 and a first thermoplastic filler component 334 distributed through the first fluoropolymer matrix component 332.

It will be appreciated that all description provided herein in reference to the low friction bearing liner 100 (200), the first low friction layer 110 (210), and the substrate 220 may further apply to corresponding aspects of low friction bearing liner 300.

According to particular embodiments, the second low friction layer 330 may have a particular content ratio TFC-$2_{WC}$/FMC-$2_{WC}$, where TFC-$2_{WC}$ is equal to the content of the second thermoplastic filler component in weight percent for a total weight of the first low friction layer, and FMC-$2_{WC}$ is the content of the second fluoropolymer matrix component in weight percent of a total weight of the first low friction layer. For example, the second low friction layer 330 may have a content ratio TFC-$2_{WC}$/FMC-$2_{WC}$ of at least about 0.01, such as, at least about 0.05 or at least about 0.1 or at least about 0.15 or at least about 0.2 or even at least about 0.25. According to still other embodiments, the second low friction layer 330 may have a content ratio TFC-$2_{WC}$/FMC-$2_{WC}$ of not greater than about 100, such as, not greater than about 90 or not greater than about 80 or not greater than about 70 or not greater than about 60 or not greater than about 50 or not greater than about 25 or not greater than about 1 or not greater than about 0.9 or not greater than about 0.8 or not greater than about 0.7 or not greater than about 0.4 or not greater than about 0.35 or even not greater than about 0.3. It will be appreciated the second low friction layer 330 may have a content ratio TFC-$2_{WC}$/FMC-$2_{WC}$ within a range between any of the minimum and maximum values noted above. It will be further appreciated that the second low friction layer 330 may have a content ratio TFC-$2_{WC}$/FMC-$2_{WC}$ of any value between any of the minimum and maximum values noted above.

According to still other embodiments, the second low friction layer 330 may have a particular content of the second fluoropolymer matrix component 332. For example, the second low friction layer 330 may have a content of the second fluoropolymer matrix component 332 of at least about 1.0 wt. % for at total weight of the first low friction layer 112, such as, at least about 5 wt. % or at least about 10 wt. % or at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or at least about 72 wt. % or at least about 74 wt. % or at least about 76 wt. % or at least about 78 wt. % or at least about 80 wt. % or at least about 82 wt. % or at least about 84 wt. % or at least about 86 wt. %. According to still other embodiments, the second low friction layer 330 may have a content of the second fluoropolymer matrix component 332 of not greater than about 100 wt. % for a total weight of the low friction layer 332, such as, not greater than about 98 wt. % or not greater than about 96 wt. % or not greater than about 94 wt. % or not greater than about 92 wt. % or not greater than about 90 wt. % or even not greater than about 88 wt. %. It will be appreciated that the second low friction layer 330 may have a content of the second fluoropolymer matrix component 332 within a range between any of the minimum and maximum values noted above. It will be further appreciated that the second low friction layer 330 may have a content of the second fluoropolymer matrix component 332 of any value between any of the minimum and maximum values noted above.

According to still other embodiments, the second fluoropolymer matrix component 332 may include a particular material. For example, the second fluoropolymer matrix component 332 may include at least one of a fluorinated ethylene propylene material, a perfluoroalkoxy alkane material, a modified PTFE material, or a combination thereof. According to particular embodiments, the second fluoropolymer matrix component 332 may consist of a fluorinated ethylene propylene material. According to still other embodiments, the second fluoropolymer matrix component 332 may consist of a perfluoroalkoxy alkane material. According to still other embodiments, the second fluoropolymer matrix component 332 may consist of a modified PTFE material.

According to still other embodiments, the second low friction layer 330 may have a particular content of the second thermoplastic filler component 334. For example, the second low friction layer 330 may have a content of the second thermoplastic filler component 334 of at least about 1.0 wt. % for a total weight of the first low friction layer 112, such as, at least about 5 wt. % or at least about 10 wt. % or at least about 15 wt. % or at least about 20 wt. % or at least about 25 wt. % or at least about 30 wt. % or at least about 35 wt. % or at least about 40 wt. % or at least about 45 wt. % or at least about 50 wt. % or at least about 55 wt. % or at least about 60 wt. % or at least about 65 wt. % or at least about 70 wt. % or at least about 72 wt. % or at least about 74 wt. % or at least about 76 wt. % or at least about 78 wt. % or at least about 80 wt. % or at least about 82 wt. % or at least about 84 wt. % or even at least about 86 wt. %. According to still other embodiments, the second low friction layer 330 may have a content of the second thermoplastic filler component 334 of not greater than about 100 wt. % for a total weight of the low friction layer 112, such as, not greater than about 98 wt. % or not greater than about 96 wt. % or not greater than about 94 wt. % or not greater than about 92 wt. % or not greater than about 90 wt. % or even not greater than about 88 wt. %. It will be appreciated that the second low friction layer 330 may have a content of the second thermoplastic filler component 334 within a range between any of the minimum and maximum values noted above. It will be further appreciated that the second low friction layer 330 may have a content of the second thermoplastic filler component 334 of any value between any of the minimum and maximum values noted above.

According to particular embodiments, the second thermoplastic filler component 334 may include a material with a particular glass transition temperature. For example, the glass transition temperature of the second thermoplastic filler component 334 may be at least about 130° C., such as, at least about 135° C. or at least about 140° C. or at least about 145° C. or at least about 150° C. or at least about 155° C. or even at least about 160° C. It will be appreciated that the glass transition temperature of the second thermoplastic filler component 334 may be within a range between any of the values noted above. It will be further appreciated that the glass transition temperature of the second thermoplastic filler component 334 may be any value between any of the values noted above.

According to particular embodiments, the second thermoplastic filler component 334 may include a material with a particular melting temperature. For example, the melting temperature of the second thermoplastic filler component 334 may be at least about 240° C., such as, at least about 245° C. or at least about 250° C. or at least about 255° C. or at least about 260° C. or at least about 265° C. or at least about 270° C. or at least about 275° C. or at least about 280° C. or at least about 285° C. or at least about 290° C. or at least about 295° C. or at least about 300° C. It will be appreciated that the melting temperature of the second thermoplastic filler component 334 may be within a range between any of the values noted above. It will be further appreciated that the melting temperature of the second thermoplastic filler component 334 may be any value between any of the values noted above.

According to still other embodiments, the second thermoplastic filler component 334 may include a particular material. For example, the second thermoplastic filler component 334 may include a polyimide (PI), a polyamide (PA), a polyamideimide (PAI), a polybenzimidazole (PBI), a polyether ether ketone (PEEK), an aromatic polyester, a polyphenylene sulfide (PPS), synthetic fibers, or any combination thereof. According to still other embodiments, the second thermoplastic filler component 334 may consist of a polyimide (PI), a polyamide (PA), a polyamideimide (PAI), a polybenzimidazole (PBI), a polyether ether ketone (PEEK), an aromatic polyester, a polyphenylene sulfide (PPS), or synthetic fibers.

According to yet other embodiments, the second low friction layer 330 may have a particular thickness. For example, the second low friction layer 330 may have a thickness of at least about 1 µm, such as, at least about 5 µm or at least about or at least about 10 µm or at least about or at least about 15 µm or at least about or at least about 20 µm or at least about or at least about 25 µm or at least about or at least about 30 µm or at least about or at least about 35 µm or at least about or at least about 40 µm or at least about or at least about 45 µm or at least about or at least about 50 µm or at least about or at least about 55 µm or at least about or at least about 60 µm or at least about 65 µm or even at least about 69 µm. According to still other embodiments, the second low friction layer 330 may have a thickness of not greater than about 125 µm, such as, not greater than about 120 µm or not greater than about 115 µm or not greater than about 110 µm or not greater than about 105 µm or not greater than about 100 µm or not greater than about 95 µm or not greater than about 90 µm or not greater than about 85 µm or not greater than about 80 µm or not greater than about 75 µm or even not greater than about 71 µm. It will be appreciated that the thickness of the second low friction layer 330 may be within a range between any of the minimum and maximum values noted above. It will be further appreciated that the second low friction layer 330 may be any value between any of the minimum and maximum values noted above.

According to yet other embodiments, the low friction bearing liner 200 may have a particular second thickness ratio LFL-$2_T$/$S_T$, where LFL-$2_T$ is equal to a thickness of the second low friction layer 330 and $S_T$ is equal to the thickness of the substrate 320. For example, the low friction bearing liner 200 may have a second thickness ratio LFL-$2_T$/$S_T$ of at least about 0.02, such as, at least about 0.03 or at least about 0.04 or at least about 0.05 or at least about 0.06 or at least about 0.07 or at least about 0.08 or at least about 0.09. According to still other embodiments, the low friction bearing liner 200 may have a second thickness ratio LFL-$2_T$/$S_T$ of not greater than about 0.4, such as, not greater than about 0.3 or not greater than about 0.2 or not greater than about 0.19 or not greater than about 0.18 or not greater than about 0.17 or not greater than about 0.16 or not greater than about 0.15 or not greater than about 0.14 or not greater than about 0.13 or not greater than about 0.12 or not greater than about 0.11. It will be appreciated that the second thickness ratio LFL-$2_T$/$S_T$ of the low friction bearing liner 300 may be within a range between any of the minimum and maximum values noted above. It will be further appreciated that the second thickness ratio LFL-$2_T$/$S_T$ of the low friction bearing liner 300 may be any value between any of the minimum and maximum values noted above.

According to yet other embodiments, the second low friction layer 330 may have a particular surface lubricated coefficient of friction. It will be appreciated that for purposes of embodiments described herein, the lubricated surface coefficient of friction of a particular layer may be measured under an 8-9 newton normal force at 100-300 mm/sec in contact with a quarter inch polyimide or steel wear sphere at a temperature of 15-140° C. and lubricated with 100-100,000 cs silicone oil. According to certain embodiments, the second low friction layer 330 may have a lubricated surface coefficient of friction of not greater than about 0.20, such as, not greater than about 0.10 or not greater than about 0.05 or not greater than about 0.02. According to still other embodiments, the second low friction layer 330 may have a lubricated surface coefficient of friction of at least about 0.005. It will be appreciated that the lubricated surface coefficient of friction of the second low friction layer 330 may be within a range between any of the minimum and maximum values noted above. It will be further appreciated that the lubricated surface coefficient of friction of the second low friction layer 330 may be any value between any of the minimum and maximum values noted above.

According to yet other embodiments, the second low friction layer 330 may have a particular surface non-lubricated coefficient of friction. It will be appreciated that for purposes of embodiments described herein, the non-lubricated surface coefficient of friction of a particular layer may be measured under an 8-9 newton normal force at 100-300 mm/sec in contact with a quarter inch polyimide or steel wear sphere at a temperature of 15-140° C. and non-lubricated with 100-100,000 cs silicone oil. According to certain embodiments, the second low friction layer 330 may have a non-lubricated surface coefficient of friction of not greater than about 0.20, such as, not greater than about 0.10 or not greater than about 0.05 or not greater than about 0.02. According to still other embodiments, the second low friction layer 330 may have a non-lubricated surface coefficient of friction of at least about 0.005. It will be appreciated that the non-lubricated surface coefficient of friction of the second low friction layer 330 may be within a range between any of the minimum and maximum values noted above. It will be further appreciated that the non-lubricated surface coefficient of friction of the second low friction layer 330 may be any value between any of the minimum and maximum values noted above.

According to yet other embodiments, the low friction bearing liner 300 may have a particular thickness. For example, the low friction bearing liner 300 may have a thickness of at least about 1 µm, such as, at least about 5 µm or at least about or at least about 10 µm or at least about or at least about 15 µm or at least about or at least about 20 µm or at least about or at least about 25 µm or at least about or at least about 30 µm or at least about or at least about 35 µm or at least about or at least about 40 µm or at least about or at least about 45 µm or at least about or at least about 50 µm or at least about or at least about 55 µm or at least about or at least about 60 µm or at least about 65 µm or even at least about 69 µm. According to still other embodiments, the low friction bearing liner 300 may have a thickness of not greater than about 500 µm, such as, not greater than about 480 µm or not greater than about 460 µm or not greater than about 440 µm or not greater than about 420 µm or not greater than about 400 µm or not greater than about 380 µm or not greater than about 360 µm or not greater than about 340 µm or not greater than about 320 µm or not greater than about 300 µm or even not greater than about 280 µm. It will be appreciated that the thickness of the low friction bearing liner 300 may be within a range between any of the minimum and maximum values noted above. It will be further appreciated that the low friction bearing liner 300 may be any value between any of the minimum and maximum values noted above.

According to still other embodiments, the low friction bearing liner 300 may have a particular wear rating. It will be appreciated that for purposes of embodiments described herein, the wear rating may be tested using a Tribometer Test measured under a 9 newton normal force at 260 mm/sec in contact with a quarter inch polyimide wear sphere at a running temperature of 140° C. and lubricated with 6,000 cs silicone oil. The wear rating is equal to the number of rotations completed before failure in a Tribometer Test and failure is defined as a 50% increase in COF versus steady-state value during the Tribometer test. According to certain embodiments, the low friction bearing liner 300 may have a wear rating of at least about 35,000, such as, at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or even at least about 250,000. It will be appreciated that the wear rating of the low friction bearing liner 300 may be within a range between any of the minimum and maximum values noted above. It will be further appreciated that the wear rating of the low friction bearing liner 300 may be any value between any of the minimum and maximum values noted above.

According to still other embodiments described herein, the low friction bearing liner may be incorporated into a solenoid.

Figure 4:
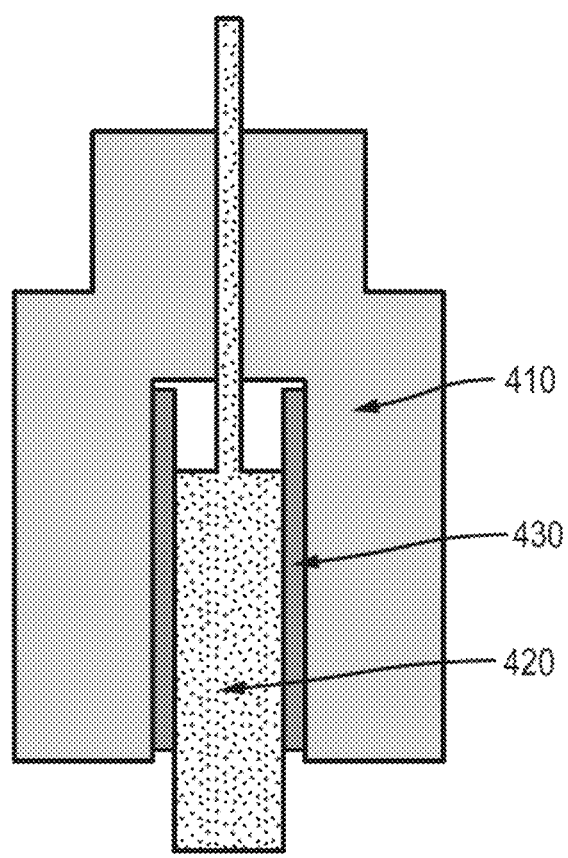

For purposes of illustration, FIG. 4 includes an illustration of a solenoid 400 according to embodiments described herein. As shown in FIG. 4, a solenoid 400 may include a barrel 410, an armature 420 within the barrel 410 and a low friction bearing liner 430 disposed between barrel 410 of the solenoid 400 and the armature 420 of the solenoid 400.

According to certain embodiments, the barrel 410 of the solenoid 400 may also be referred to as a poletube. According to certain embodiments, it may be milled out of a single piece or welded out of at least two pieces.

According to still other embodiments, the armature 420 of the solenoid 400 may also be referred to as a plunger or piston.

According to certain embodiments, the low friction bearing liner 430 may be attached to an inner surface of the barrel 410 of the solenoid.

According to yet other embodiments, the solenoid 400 may be configured such that the armature 420 is a moving part that contacts as surface of the low friction bearing liner 430 during movement.

According to still other embodiments, it will be appreciated that the low friction bearing liner 430 of the solenoid 400, as shown in FIG. 4, may include any of the components and may be described as having any of the characteristics described herein with reference to the low friction bearing liner 100 as shown in FIG. 1, low friction bearing liner 200 as shown in FIG. 2, and/or low friction bearing liner 300 as shown in FIG. 3.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A low friction bearing liner for a solenoid, the low friction bearing liner comprising a first low friction layer, wherein the first low friction layer comprises a first fluoropolymer matrix component and a first thermoplastic filler component distributed throughout the first fluoropolymer matrix component, wherein the content of the first fluoropolymer matrix component is at least about 1 wt. % and not greater than about 99 wt. % for a total weight of the first low friction layer, and wherein the content of the first thermoplastic filler component is at least about 1 wt. % and not greater than about 99 wt. % for a total weight of the first low friction layer.

Embodiment 2. A low friction bearing liner for a solenoid, the low friction bearing liner comprising a first low friction layer, wherein the first low friction layer comprises a first fluoropolymer matrix component and a first thermoplastic filler component distributed throughout the first fluoropolymer matrix component, wherein the first low friction layer further comprises a content ratio TFC-1$_{WC}$/FMC-1$_{WC}$ of at least about 0.01 and not greater than about 0.45.

Embodiment 3. The low friction bearing liner of any one of embodiments 1 and 2, wherein the low friction bearing liner has a non-lubricated surface coefficient of friction of not greater than about 0.20.

Embodiment 4. The low friction bearing liner of any one of embodiments 1 and 2, wherein the first low friction layer has a non-lubricated surface coefficient of friction of not greater than about 0.20.

Embodiment 5. The low friction bearing liner of any one of embodiments 1 and 2, further comprising a wear rating of at least about 32,000, where the wear rating is equal to the number of rotations completed before failure in a Tribometer Test and failure is defined as a 50% increase in COF versus steady-state value during the Tribometer test, or at least about 35,000 or at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or at least about 250,000.

Embodiment 6. The low friction bearing liner of embodiment 1, wherein the first low friction layer further comprises a content ratio TFC-$1_{WC}$/FMC-$1_{WC}$ of at least about 0.01 and not greater than about 100.

Embodiment 7. The low friction bearing liner of embodiment 2, wherein the content of the first fluoropolymer matrix component is at least about 1 wt. % and not greater than about 99 wt. % for a total weight of the first low friction layer, and wherein the content of the first thermoplastic filler component is at least about 1 wt. % and not greater than about 30 wt. % for a total weight of the first low friction layer.

Embodiment 8. The low friction bearing liner of any one of embodiments 1 and 2, wherein the first fluoropolymer matrix component comprises at least one of a fluorinated ethylene propylene material, a perfluoroalkoxy alkane material, a modified PTFE material, or a combination thereof.

Embodiment 9. The low friction bearing liner of any one of embodiments 1 and 2, wherein the first low friction layer consists of a fluorinated ethylene propylene material.

Embodiment 10. The low friction bearing liner of any one of embodiments 1 and 2, wherein the first low friction layer consists of a polytetrafluoroethylene material.

Embodiment 11. The low friction bearing liner of any one of embodiments 1 and 2, wherein the first low friction layer consists of a fluorinated ethylene propylene material.

Embodiment 12. The low friction bearing liner of any one of embodiments 1 and 2, wherein the first thermoplastic filler has a glass transition temperature of at least about 130° C.

Embodiment 13. The low friction bearing liner of any one of embodiments 1 and 2, wherein the first thermoplastic filler has a melting temperature of at least about 240° C.

Embodiment 14. The low friction bearing liner of any one of embodiments 1 and 2, wherein the first thermoplastic filler comprises a polyimide (PI), a polyamide (PA), a polyamideimide (PAI), a polybenzimidazole (PBI), a polyether ether ketone (PEEK), an aromatic polyester, a polyphenylene sulfide (PPS), synthetic fibers, or any combination thereof.

Embodiment 15. The low friction bearing liner of any one of embodiments 1 and 2, wherein the first thermoplastic filler consists of a polyimide (PI), a polyamide (PA), a polyamideimide (PAI), a polybenzimidazole (PBI), a polyether ether ketone (PEEK), an aromatic polyester, a polyphenylene sulfide (PPS), or synthetic fibers, or any combination thereof.

Embodiment 16. The low friction bearing liner of any one of embodiments 1 and 2, wherein the first low friction layer has a thickness of at least about 1 micron.

Embodiment 17. The low friction bearing liner of any one of embodiments 1 and 2, wherein the first low friction layer has a thickness of not greater than about 125 microns.

Embodiment 18. The low friction bearing liner of any one of embodiments 1 and 2, wherein the low friction bearing liner has a thickness of at least about 1 micron.

Embodiment 19. The low friction bearing liner of any one of embodiments 1 and 2, wherein the low friction bearing liner has a thickness of not greater than about 500 microns.

Embodiment 20. The low friction bearing liner of any one of embodiments 1 and 2, wherein the low friction bearing liner further comprises a substrate underlying the first low friction layer.

Embodiment 21. The low friction bearing liner of embodiment 20, wherein the substrate comprises a polyimide material.

Embodiment 22. The low friction bearing liner of embodiment 20, wherein the substrate consists of a polyimide material.

Embodiment 23. The low friction bearing liner of embodiment 20, wherein the substrate comprises a fabric.

Embodiment 24. The low friction bearing liner of embodiment 20, wherein the substrate consists of a fabric.

Embodiment 25. The low friction bearing liner of embodiment 20, the substrate comprises a woven fiberglass fabric.

Embodiment 26. The low friction bearing liner of embodiment 20, wherein the substrate consists of a woven fiberglass fabric.

Embodiment 27. The low friction bearing liner of embodiment 20, further comprising a thickness ratio LFL-$1_T$/$S_T$ of at least about 0.05, where LFL-$1_T$ is equal to the thickness of the first outer layer and $S_T$ is equal to the thickness of the substrate, at least about 0.06 or at least about 0.07 or at least about 0.08 or at least about 0.09.

Embodiment 28. The low friction bearing liner of embodiment 20, wherein the substrate has a thickness of at least about 25 µm or at least about 30 µm or at least about 35 µm or at least about 40 µm or at least about 45 µm or at least about 49 µm.

Embodiment 29. The low friction bearing liner of embodiment 20, wherein the substrate has a thickness of not greater than about 75 µm or not greater than about 70 µm or not greater than about 65 µm or not greater than about 60 µm or not greater than about 55 µm or not greater than about 51 µm.

Embodiment 30. The low friction bearing liner of embodiment 20, wherein the low friction bearing liner has a thickness of at least about 1 µm.

Embodiment 31. The low friction bearing liner of embodiment 20, wherein the low friction bearing liner has a thickness of not greater than about 500 µm.

Embodiment 32. The low friction bearing liner of embodiment 20, wherein the low friction bearing liner further comprises a second low friction layer underlying the substrate, wherein the second low friction layer comprises a second fluoropolymer matrix component and a second thermoplastic filler component distributed throughout the second fluoropolymer matrix component.

Embodiment 33. The low friction bearing liner of embodiment 32, wherein the second low friction layer further comprises a content ratio TFC-$2_{WC}$/FMC-$2_{WC}$ of at least about 0.01 and not greater than about 100.

Embodiment 34. The low friction bearing liner of embodiment 32, wherein the content of the second fluoropolymer matrix component is at least about 1 wt. % and not greater than about 99 wt. % for a total weight of the second low friction layer, and wherein the content of the second thermoplastic filler component is at least about 1 wt. % and not greater than about 99 wt. % for a total weight of the second low friction layer.

Embodiment 35. The low friction bearing liner of embodiment 32, wherein the second fluoropolymer matrix component comprises at least one of a fluorinated ethylene propylene material, a perfluoroalkoxy alkane material, a modified PTFE material, or a combination thereof.

Embodiment 36. The low friction bearing liner of embodiment 32, wherein the second low friction layer consists of a fluorinated ethylene propylene material.

Embodiment 37. The low friction bearing liner of embodiment 32, wherein the second low friction layer consists of a polytetrafluoroethylene material.

Embodiment 38. The low friction bearing liner of embodiment 32, wherein the second low friction layer consists of a fluorinated ethylene propylene material.

Embodiment 39. The low friction bearing liner of embodiment 32, wherein the second thermoplastic filler comprises a polyimide (PI), a polyamide (PA), a polyamideimide (PAI), a polybenzimidazole (PBI), a polyether ether ketone (PEEK), an aromatic polyester, a polyphenylene sulfide (PPS), synthetic fibers, or any combination thereof.

Embodiment 40. The low friction bearing liner of embodiment 32, wherein the second thermoplastic filler consists of a polyimide (PI), a polyamide (PA), a polyamideimide (PAI), a polybenzimidazole (PBI), a polyether ether ketone (PEEK), an aromatic polyester, a polyphenylene sulfide (PPS), or synthetic fibers.

Embodiment 41. The low friction bearing liner of embodiment 32, the second low friction layer has a thickness of at least about 1 microns.

Embodiment 42. The low friction bearing liner of embodiment 32, wherein the second low friction layer has a thickness of not greater than about 125 microns.

Embodiment 43. The low friction bearing liner of embodiment 32, wherein the low friction bearing liner has a thickness of at least about 1 microns.

Embodiment 44. The low friction bearing liner of embodiment 32, wherein the low friction bearing liner has a thickness of not greater than about 500 microns.

Embodiment 45. The low friction bearing liner of embodiment 32, further comprising a thickness ratio $LFL\text{-}2_T/S_T$ of at least about 0.05, where $LFL\text{-}2_T$ is equal to the thickness of the first outer layer and $S_T$ is equal to the thickness of the substrate, at least about 0.06 or at least about 0.07 or at least about 0.08 or at least about 0.09.

Embodiment 46. A solenoid comprising: a barrel; an armature within the barrel; and a low friction bearing liner disposed between an inner surface of the barrel and an outer surface of the armature, wherein the low friction bearing liner comprises a first low friction layer, wherein the first low friction layer comprises a first fluoropolymer matrix component and a first thermoplastic filler component distributed throughout the first fluoropolymer matrix component, wherein the content of the first fluoropolymer matrix component is at least about 1 wt. % and not greater than about 100 wt. % for a total weight of the first low friction layer, and wherein the content of the first thermoplastic filler component is at least about 1 wt. % and not greater than about 100 wt. % for a total weight of the first low friction layer.

Embodiment 47. A solenoid comprising: a barrel; an armature within the barrel; and a low friction bearing liner disposed between an inner surface of the barrel and an outer surface of the armature, wherein the low friction bearing liner comprises a first low friction layer, wherein the first low friction layer comprises a first fluoropolymer matrix component and a first thermoplastic filler component distributed throughout the first fluoropolymer matrix component, wherein the first low friction layer further comprises a content ratio $TFC\text{-}1_{WC}/FMC\text{-}1_{WC}$ of at least about 0.01 and not greater than about 100.

Embodiment 48. The solenoid of any one of embodiments 46 and 47, wherein the low friction bearing liner is attached to the inner surface of the barrel.

Embodiment 49. The solenoid of embodiment 47, wherein the low friction bearing liner has a non-lubricated surface coefficient of friction of not greater than about 0.20.

Embodiment 50. The solenoid of embodiment 47, wherein the first low friction layer has a non-lubricated surface coefficient of friction of not greater than about 0.20.

Embodiment 51. The solenoid of embodiment 47, further comprising a wear rating of at least about 32,000, where the wear rating is equal to the number of rotations completed before failure in a Tribometer Test and failure is defined as a 50% increase in COF versus steady-state value during the Tribometer test, or at least about 35,000 or at least about 40,000 or at least about 45,000 or at least about 50,000 or at least about 75,000 or at least about 100,000 or at least about 125,000 or at least about 150,000 or at least about 175,000 or at least about 200,000 or at least about 225,000 or at least about 250,000.

Embodiment 52. The solenoid of embodiment 47, wherein the first low friction layer further comprises a content ratio $TFC\text{-}1_{WC}/FMC\text{-}1_{WC}$ of at least about 0.01 and not greater than about 100.

Embodiment 53. The solenoid of embodiment 47, wherein the content of the first fluoropolymer matrix component is at least about 1 wt. % and not greater than about 99 wt. % for a total weight of the first low friction layer, and wherein the content of the first thermoplastic filler component is at least about 1 wt. % and not greater than about 99 wt. % for a total weight of the first low friction layer.

Embodiment 54. The solenoid of embodiment 47, wherein the first fluoropolymer matrix component comprises at least one of a fluorinated ethylene propylene material, a perfluoroalkoxy alkane material, a modified PTFE material, or a combination thereof.

Embodiment 55. The solenoid of embodiment 47, wherein the first low friction layer consists of a fluorinated ethylene propylene material.

Embodiment 56. The solenoid of embodiment 47, wherein the first low friction layer consists of a polytetrafluoroethylene material.

Embodiment 57. The solenoid of embodiment 47, the first low friction layer consists of a fluorinated ethylene propylene material.

Embodiment 58. The solenoid of embodiment 47, wherein the first thermoplastic filler comprises a polyimide (PI), a polyamide (PA), a polyamideimide (PAI), a polybenzimidazole (PBI), a polyether ether ketone (PEEK), an aromatic polyester, a polyphenylene sulfide (PPS), synthetic fibers, or any combination thereof.

Embodiment 59. The solenoid of embodiment 47, wherein the first thermoplastic filler consists of a polyimide (PI), a polyamide (PA), a polyamideimide (PAI), a polybenzimidazole (PBI), a polyether ether ketone (PEEK), an aromatic polyester, a polyphenylene sulfide (PPS), or synthetic fibers.

Embodiment 60. The solenoid of embodiment 47, wherein the first low friction layer has a thickness of at least about 1 micron.

Embodiment 61. The solenoid of embodiment 47, wherein the first low friction layer has a thickness of not greater than about 125 microns.

Embodiment 62. The solenoid of embodiment 47, wherein the low friction bearing liner has a thickness of at least about 1 micron.

Embodiment 63. The solenoid of embodiment 47, wherein the low friction bearing liner has a thickness of not greater than about 500 microns.

Embodiment 64. The solenoid of embodiment 47, wherein the low friction bearing liner further comprises a substrate underlying the first low friction layer.

Embodiment 65. The solenoid of embodiment 64, wherein the substrate comprises a polyimide material.

Embodiment 66. The solenoid of embodiment 64, wherein the substrate consists of a polyimide material.

Embodiment 67. The solenoid of embodiment 64, wherein the substrate comprises a fabric.

Embodiment 68. The solenoid of embodiment 64, wherein the substrate consists of a fabric.

Embodiment 69. The solenoid of embodiment 64, the substrate comprises a woven fiberglass fabric.

Embodiment 70. The solenoid of embodiment 64, wherein the substrate consists of a woven fiberglass fabric.

Embodiment 71. The solenoid of embodiment 64, further comprising a thickness ratio $LFL-1_T/S_T$ of at least about 0.05, where $LFL-1_T$ is equal to the thickness of the first outer layer and $S_T$ is equal to the thickness of the substrate, at least about 0.06 or at least about 0.07 or at least about 0.08 or at least about 0.09.

Embodiment 72. The solenoid of embodiment 64, wherein the substrate has a thickness of at least about 25 μm or at least about 30 μm or at least about 35 μm or at least about 40 μm or at least about 45 μm or at least about 49 μm.

Embodiment 73. The solenoid of embodiment 64, wherein the substrate has a thickness of not greater than about 75 μm or not greater than about 70 μm or not greater than about 65 μm or not greater than about 60 μm or not greater than about 55 μm or not greater than about 51 μm.

Embodiment 74. The solenoid of embodiment 64, wherein the low friction bearing liner has a thickness of at least about 50 μm or at least about 55 μm or at least about or at least about 60 μm or at least about 65 μm or at least about 69 μm.

Embodiment 75. The solenoid of embodiment 64, wherein the low friction bearing liner has a thickness of not greater than about 100 μm or not greater than about 95 μm or not greater than about 90 μm or not greater than about 85 μm or not greater than about 80 μm or not greater than about 75 μm or not greater than about 71 μm.

Embodiment 76. The solenoid of embodiment 64, wherein the low friction bearing liner further comprises a second low friction layer underlying the substrate, wherein the second low friction layer comprises a second fluoropolymer matrix component and a second thermoplastic filler component distributed throughout the second fluoropolymer matrix component.

Embodiment 77. The solenoid of embodiment 76, wherein the second low friction layer further comprises a content ratio $TFC-1_{WC}/FMC-1_{WC}$ of at least about 0.01 and not greater than about 100.

Embodiment 78. The solenoid of embodiment 76, wherein the content of the second fluoropolymer matrix component is at least about 1 wt. % and not greater than about 99 wt. % for a total weight of the second low friction layer, and wherein the content of the second thermoplastic filler component is at least about 1 wt. % and not greater than about 99 wt. % for a total weight of the second low friction layer.

Embodiment 79. The solenoid of embodiment 76, wherein the second fluoropolymer matrix component comprises at least one of a fluorinated ethylene propylene material, a perfluoroalkoxy alkane material, a modified PTFE material, or a combination thereof.

Embodiment 80. The solenoid of embodiment 76, wherein the second low friction layer consists of a fluorinated ethylene propylene material.

Embodiment 81. The solenoid of embodiment 76, wherein the second low friction layer consists of a polytetrafluoroethylene material.

Embodiment 82. The solenoid of embodiment 76, wherein the second low friction layer consists of a fluorinated ethylene propylene material.

Embodiment 83. The solenoid of embodiment 76, wherein the second thermoplastic filler comprises a polyimide (PI), a polyamide (PA), a polyamideimide (PAI), a polybenzimidazole (PBI), a polyether ether ketone (PEEK), an aromatic polyester, a polyphenylene sulfide (PPS), synthetic fibers, or any combination thereof.

Embodiment 84. The solenoid of embodiment 76, wherein the second thermoplastic filler consists of a polyimide (PI), a polyamide (PA), a polyamideimide (PAI), a polybenzimidazole (PBI), a polyether ether ketone (PEEK), an aromatic polyester, a polyphenylene sulfide (PPS), or synthetic fibers.

Embodiment 85. The solenoid of embodiment 76, the second low friction layer has a thickness of at least about 1 microns.

Embodiment 86. The solenoid of embodiment 76, wherein the second low friction layer has a thickness of not greater than about 125 microns.

Embodiment 87. The solenoid of embodiment 76, wherein the low friction bearing liner has a thickness of at least about 1 microns.

Embodiment 88. The solenoid of embodiment 76, wherein the low friction bearing liner has a thickness of not greater than about 500 microns.

Embodiment 89. The solenoid of embodiment 76, further comprising a thickness ratio $LFL-2_T/S_T$ of at least about 0.05, where $LFL-2_T$ is equal to the thickness of the first outer layer and $S_T$ is equal to the thickness of the substrate, at least about 0.06 or at least about 0.07 or at least about 0.08 or at least about 0.09.

EXAMPLES

Example 1

The concepts described herein will be further described in the following Examples, which do not limit the scope of the invention described in the claims.

Sample low friction liners S1-S10 were formed according to embodiments described herein. Sample low friction liner S1 includes a matrix of PTFE containing a 15 wt. % PEEK filler, where the PEEK has a $d_{50}$ particle size of 11.22 microns. Sample S2 includes a matrix of PTFE containing 5 wt. % PEEK filler, where the PEEK has a $d_{50}$ particle size of 11.22 microns. Sample low friction liner S3 includes a matrix of PTFE containing 15 wt. % PBI filler, where the PBI has a $d_{50}$ particle size of 5.26 microns. Sample low friction liner S4 includes a matrix of PTFE containing 5 wt. % PBI filler, where the PBI has a $d_{50}$ particle size of 5.26 microns. Sample low friction liner S5 includes a matrix of PTFE containing 15 wt. % PAI filler, where the PAI has a $d_{50}$ particle size of 4.22 microns. Sample low friction liner S6 includes a matrix of PTFE containing 5 wt. % PAI where the PAI has a $d_{50}$ particle size of 4.22 microns. Sample low friction liner S7 includes a matrix of PTFE containing 15 wt. % aromatic polyester where the aromatic polyester has a $d_{50}$ particle size of 9.3 microns. Sample low friction liner S8 includes a matrix of PTFE containing 5 wt. % aromatic polyester where the aromatic polyester has a $d_{50}$ particle size of 9.3 microns. Sample low friction liner S9 includes a matrix of PTFE containing 15 wt. % polyamide where the polyamide has a $d_{50}$ particle size of 3.43 microns. Sample low friction liner S10 includes a matrix of PTFE containing 5 wt. % polyamide where the polyamide has a $d_{50}$ particle size of 3.43 microns.

A comparative sample low friction liner CS1 was prepared for comparison to Sample low friction liners S1-S10. Comparative sample low friction liner CS1 includes 100 wt. % PTFE.

Sample low friction liners S1-S10 and comparative sample low friction liner CS1 were tested to determine their coefficient of frictions after 83 minutes and their wear rating after 83 minutes using a Tribometer Test measured under a 8 newton normal force at 260 mm/sec in contact with a quarter inch polyimide wear sphere at a running temperature of 140° C. and lubricated with 6,000 cs silicone oil. The results of the tests for each sample are summarized in Table 1 below.

TABLE 1

Tribometer Test Results

| SAMPLE NOs. | COF (30 MPA/83 Min) | Wear Rating (30 MPA/83 Min) |
| --- | --- | --- |
| S1 | 0.1326 | 0.895 mm |
| S2 | 0.1357 | 1.246 mm |
| S3 | 0.1478 | 0.889 mm |
| S4 | 0.1505 | 1.037 mm |
| S5 | 0.1421 | 0.965 mm |
| S6 | 0.1468 | 1.029 mm |
| S7 | 0.1485 | 1.052 mm |
| S8 | 0.1448 | 1.221 mm |
| S9 | 0.1523 | 1.178 mm |
| S10 | 0.1397 | 1.355 mm |
| CS1 | 0.1646 | 2.21 mm |

Example 2

Sample low friction liners S11 and S12 were formed according to embodiments described herein. Sample low friction liner S11 includes a composition of 5 wt. % PTFE and 95 wt. % PEEK, where the PEEK has a $d_{50}$ particle size of 11.22 microns. Sample S12 includes a composition of 15 wt. % PTFE and 85 wt. % PEEK filler, where the PEEK has a $d_{50}$ particle size of 11.22 microns.

A comparative sample low friction liner CS2 was prepared for comparison to Sample low friction liners S11-S12. Comparative sample low friction liner CS2 includes 100 wt. % PEEK, where the PEEK has a $d_{50}$ particle size of 11.22 microns.

Sample low friction liners S11, S12, and comparative sample low friction liner CS2 were tested to determine their coefficient of frictions after 83 minutes and their wear rating after 83 minutes using a Tribometer Test measured under a 8 newton normal force at 260 mm/sec in contact with a quarter inch polyimide wear sphere at a running temperature of 140° C. and lubricated with 6,000 cs silicone oil. The results of the tests for each sample are summarized in Table 2 below.

TABLE 2

Tribometer Test Results

| SAMPLE NOs. | COF (30 MPA/83 Min) | Wear Rating (30 MPA/83 Min) |
| --- | --- | --- |
| S11 | 0.2088 | 0.434 mm |
| S12 | 0.2316 | 0.534 mm |
| CS2 | 0.2565 | 0.757 mm |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A low friction bearing liner for a solenoid, the low friction bearing liner comprising a first low friction layer,
    wherein the first low friction layer comprises a first fluoropolymer matrix component and a first thermoplastic filler component distributed throughout the first fluoropolymer matrix component;
    wherein the content of the first fluoropolymer matrix component is at least about 1 wt. % and not greater than about 99 wt. % for a total weight of the first low friction layer,
    wherein the content of the first thermoplastic filler component is at least about 1 wt. % and not greater than about 99 wt. % for a total weight of the first low friction layer, and
    wherein the thermoplastic filler has a $d_{50}$ particle size in the range of 3.43 to 11.22 microns.

2. The low friction bearing liner of claim 1, the low friction bearing liner has a non-lubricated surface coefficient of friction of not greater than about 0.20.

3. The low friction bearing liner of claim 1, wherein the first low friction layer has a non-lubricated surface coefficient of friction of not greater than about 0.20.

4. The low friction bearing liner of claim 1, further comprising a wear rating of at least about 32,000, where the wear rating is equal to the number of rotations completed before failure in a Tribometer Test and failure is defined as a 50% increase in COF versus steady-state value during the Tribometer test.

5. The low friction bearing liner of claim 1, wherein the first low friction layer further comprises a content ratio $\text{TFC-1}_{WC}/\text{FMC-1}_{WC}$ of at least about 0.01 and not greater than about 100.

6. The low friction bearing liner of claim 1, wherein the first fluoropolymer matrix component comprises at least one of a fluorinated ethylene propylene material, a perfluoroalkoxy alkane material, a modified PTFE material, or a combination thereof.

7. The low friction bearing liner of claim 1, wherein the first low friction layer consists of a fluorinated ethylene propylene material.

8. The low friction bearing liner of claim 1, wherein the first low friction layer consists of a polytetrafluoroethylene material.

9. The low friction bearing liner of claim 1, wherein the first thermoplastic filler has a glass transition temperature of at least about 130° C. and not greater than about 240° C.

10. The low friction bearing liner of claim 1, wherein the first thermoplastic filler comprises a polyimide (PI), a polyamide (PA), a polyamideimide (PAI), a polybenzimidazole (PBI), a polyether ether ketone (PEEK), an aromatic polyester, a polyphenylene sulfide (PPS), synthetic fibers, or any combination thereof.

11. The low friction bearing liner of claim 1, wherein the first low friction layer has a thickness of at least about 1 micron and not greater than about 125 microns.

12. A low friction bearing liner for a solenoid, the low friction bearing liner comprising a first low friction layer,
wherein the first low friction layer comprises a first fluoropolymer matrix component and a first thermoplastic filler component distributed throughout the first fluoropolymer matrix component,
wherein the first low friction layer further comprises a content ratio $\text{TFC-1}_{WC}/\text{FMC-1}_{WC}$ of at least about 0.01 and not greater than 0.45, and
wherein the thermoplastic filler has a $d_{50}$ particle size in the range of 3.43 to 11.22 microns.

13. The low friction bearing liner of claim 12, the low friction bearing liner has a non-lubricated surface coefficient of friction of not greater than about 0.20.

14. The low friction bearing liner of claim 12, wherein the first low friction layer has a non-lubricated surface coefficient of friction of not greater than about 0.20.

15. The low friction bearing liner of claim 12, further comprising a wear rating of at least about 32,000, where the wear rating is equal to the number of rotations completed before failure in a Tribometer Test and failure is defined as a 50% increase in COF versus steady-state value during the Tribometer test.

16. The low friction bearing liner of claim 12, wherein the first low friction layer further comprises a content ratio $\text{TFC-1}_{WC}/\text{FMC-1}_{WC}$ of at least about 0.01 and not greater than about 0.1.

17. The low friction bearing liner of claim 12, wherein the first fluoropolymer matrix component comprises at least one of a fluorinated ethylene propylene material, a perfluoroalkoxy alkane material, a modified PTFE material, or a combination thereof.

18. The low friction bearing liner of claim 12, wherein the content of the first fluoropolymer matrix component is at least about 1 wt. % and not greater than about 99 wt. % for a total weight of the first low friction layer, and wherein the content of the first thermoplastic filler component is at least about 1 wt. % and not greater than about 30 wt. % for a total weight of the first low friction layer.

19. A solenoid comprising:
a barrel;
an armature within the barrel; and
a low friction bearing liner disposed between an inner surface of the barrel and an outer surface of the armature, wherein the low friction bearing liner comprises a first low friction layer,
wherein the first low friction layer comprises a first fluoropolymer matrix component and a first thermoplastic filler component distributed throughout the first fluoropolymer matrix component,
wherein the content of the first fluoropolymer matrix component is at least about 1 wt. % and not greater than about 100 wt. % for a total weight of the first low friction layer,
wherein the content of the first thermoplastic filler component is at least about 1 wt. % and not greater than about 100 wt. % for a total weight of the first low friction layer, and
wherein the thermoplastic filler has a $d_{50}$ particle size in the range of 3.43 to 11.22 microns.

* * * * *